PACKAGED CORNERING STATION

Filed May 5, 1966 3 Sheets-Sheet 1

INVENTORS
WILBERN F. DAVIS
EARL E. MASTERSON
FRANK H. SCHALLER

John J. McCormack
ATTORNEY

Dec. 10, 1968 F. H. SCHALLER ET AL 3,415,511

PACKAGED CORNERING STATION

Filed May 6, 1966 3 Sheets-Sheet 2

INVENTORS
WILBERN F. DAVIS
EARL E. MASTERSON
FRANK H. SCHALLER

John J. McCormack ATTORNEY

PACKAGED CORNERING STATION

Filed May 5, 1966 3 Sheets-Sheet 3

INVENTORS
WILBERN F. DAVIS
EARL E. MASTERSON
FRANK H. SCHALLER

John J. McCormack ATTORNEY

United States Patent Office 3,415,511
Patented Dec. 10, 1968

3,415,511
PACKAGED CORNERING STATION

Frank H. Schaller, Needham Heights, Wilbern F. Davis, Sharon, and Earl E. Masterson, Newtonville, Mass., assignors to Honeywell Inc., Minneapolis, Minn., a corporation of Delaware Filed May 5, 1966, Ser. No. 547,878
11 Claims. (Cl. 271—80)

ABSTRACT OF THE DISCLOSURE

A cornering station package for incorporation in a document handling machine where, in a prime embodiment, the station comprises an integral, replaceable unit 1 including the following integrally-packaged elements: a wait-station surface strobe cell mask 23 for receiving injected documents (e.g. picked cards) thrust along arrow *ai* there-onto; a resilient aligning and damping stop-rail assembly 3 for decelerating and aligning documents so-injected along surface 23 to be thereafter thrust transversely, along direction *ar*, past a read station R by a pinch roll assembly and transport roller assembly 5 mounted upon unit 1 and adapted to receive cards so thrust to advance them past read station R; a depressing guide assembly 4 supported by unit 1 and including a hold-down plate 41 adapted to resiliently depress and align documents while being thrust across reference surfaces 23, 25 and preferably also with control electronics housed in unit 1 (such as within section 110 of the frame).

The present invention relates to document handling means for business machines and more particularly to a demountable cornering station unit therefor, arranged to mount a plurality of punched card manipulating means in fixed spaced relation with one another and to include lateral guide means adapted to smoothly, gently and quietly engage injected documents in a plurality of document sizes and to arrest and align them along a resilient surface while diverting them.

The invention will be described below as embodied in a read station portion of a business machine adapted to handle and interpret punched cards and the like; though of course, it will be evident to those skilled in the art that it may be employed in other related discrete-record handling devices. Computers are forcing card handling devices to perform at higher and higher speeds with the result that their design and inter-relation of parts becomes increasingly more subtly and precisely defined. However, as such devices become more common and increasingly competitive, cost factors become more important as well. These two factors, higher performance and lower cost, are often in conflict and, at times, force a "trade-off" which results in a design which is wholly satisfactory in neither respect. For instance, on the one hand, higher handling speeds require a more precise design for card guiding and aligning devices, card advancing rollers and the like (e.g. regarding the relative spacing of parts); while, on the other hand, cost-reduction pressures demand techniques which prejudice such careful dimensional control, i.e. such things as: mass production techniques, assembly and maintenance by unskilled labor, manufacture of subassemblies at different remote locations, modularity of design for use in different machine configurations and/or with different document configurations; and employment of cheap materials and standard, non-specialized parts.

Furthermore, the high labor costs and expensive downtime of today's computer demands that computer-related equipment be serviced as quickly, as easily and as infrequently as possible. Prior art card handling units have had great difficulty trying to satisfy these antagonistic objectives and have left much to be desired. The present invention, however, approaches closer to satisfying these objectives, providing a simply-constructed removable "plug-in" cornering/reading station which includes card-guiding and card-advancing means mounted thereon in prescribed relation. It is an especial advantage in the art to provide such a "plug-in" station which gives easy access to these associated parts and allows extremely quick and economical replacement. For instance, it enables an unskilled laborer to remove the station and quickly install a replacement merely by turning a few bolts, thereafter sending the defective unit to the factory where it may be more economically and efficiently repaired. This concept of sending the part to the mechanic, rather than vice versa, results in a great saving in labor and convenience as well as a very little loss in machine operating-time—something quite expensive these days.

Those skilled in the art will recognize that it has become important, for simplification of card handling equipment, to provide elements which perform multiple functions. According to a feature of the present invention, a multi-function, yet very simple, card-cornering flexure is provided for resiliently engaging cards thrust thereagainst across a platform and operates both to reduce impact damage to card edges as well as to reduce noise, besides being pivotable-open, it also facilitates inspection. More particularly, a cornering rail is provided using elongate flexure plate means as a card-decelerating aliging element. An exemplary embodiment of such a guiding/aligning flexure is illustrated in FIGURES 1–3 and 5 as part of a cornering assembly 3 in a "plug-in" cornering/read station 1. Station 1 includes a read plate R associated with a read station and a strobe mask 23 associated with related read-strobing means for controlling the output of the read-station, both being photo-activated by a light source L.

One characteristic of masks 23 and R is that they are "surface-illuminated," such as by a lamp L, for energization thereof. Such a design requires that alignment means, such as that provided by assembly 3 "shadow" as little of an adjacent mask 23 as possible. The side mounted assembly 3, as described below, provides alignment means accommodating such detectors where more conventional arrangements could not. Another such alignment means taught by the invention is a hold-down assembly 4. This will likewise be seen to accommodate the top-illuminated detectors below read plate R. Thus, it is an object of the present invention to provide card-handling means answering the above problems and providing the features and advantages mentioned above.

Another object is to provide an integral, plug-in card-handling station. Another object is to provide such a station for accommodating, in one unitary package, card reading means, strobe means, associated control circuit means, translating means, associated guide means and the like.

A further object is to provide such a station including a resilient cornering rail with card-engaging flexure means. Yet another object is to provide such a station including depressing guide means.

Still another object is to provide an elongate resilient guide rail including an elongate flexure means for resiliently engaging a card edge along the length thereof to better arrest it and guide it along a diversion path.

Still another object is to arrange such a guide rail and flexure means to also include stop-flexure means for aligning shorter-length cards while accommodating longer cards.

Yet a further object is to provide such a guide rail and guide means which are resiliently pivotable away from the reference surface, providing easy access thereto. Still another object is to provide such guide means which nonetheless pass illumination to adjacent detector elements.

The foregoing and other objects of the invention are achieved by the provision in the following embodiment of a plug-in cornering station including a frame which is readily detachable from an associated punched card-handling machine and is adapted to mount in fixed relation, detecting means (such as strobe means, associated card reading means and associated circuitry) reference surface means along which cards are transported, card-advancing roller means; and cornering alignment means including a free-end flexure plate as well as a depressing plate adapted to resiliently urge cards into prescribed alignment relative said surface means, and to be pivotable away therefrom, giving access thereto.

The various features of novelty which characterize the invention are pointed out with particularity in the claims annexed thereto and form a part of the present specification. For a better understanding of the invention, its advantages and specific objects attained with its use, reference should be had to the preferred embodiment described and illustrated in the accompanying description matter and drawings, wherein like reference numerals denote like parts:

Figures 1, 5:
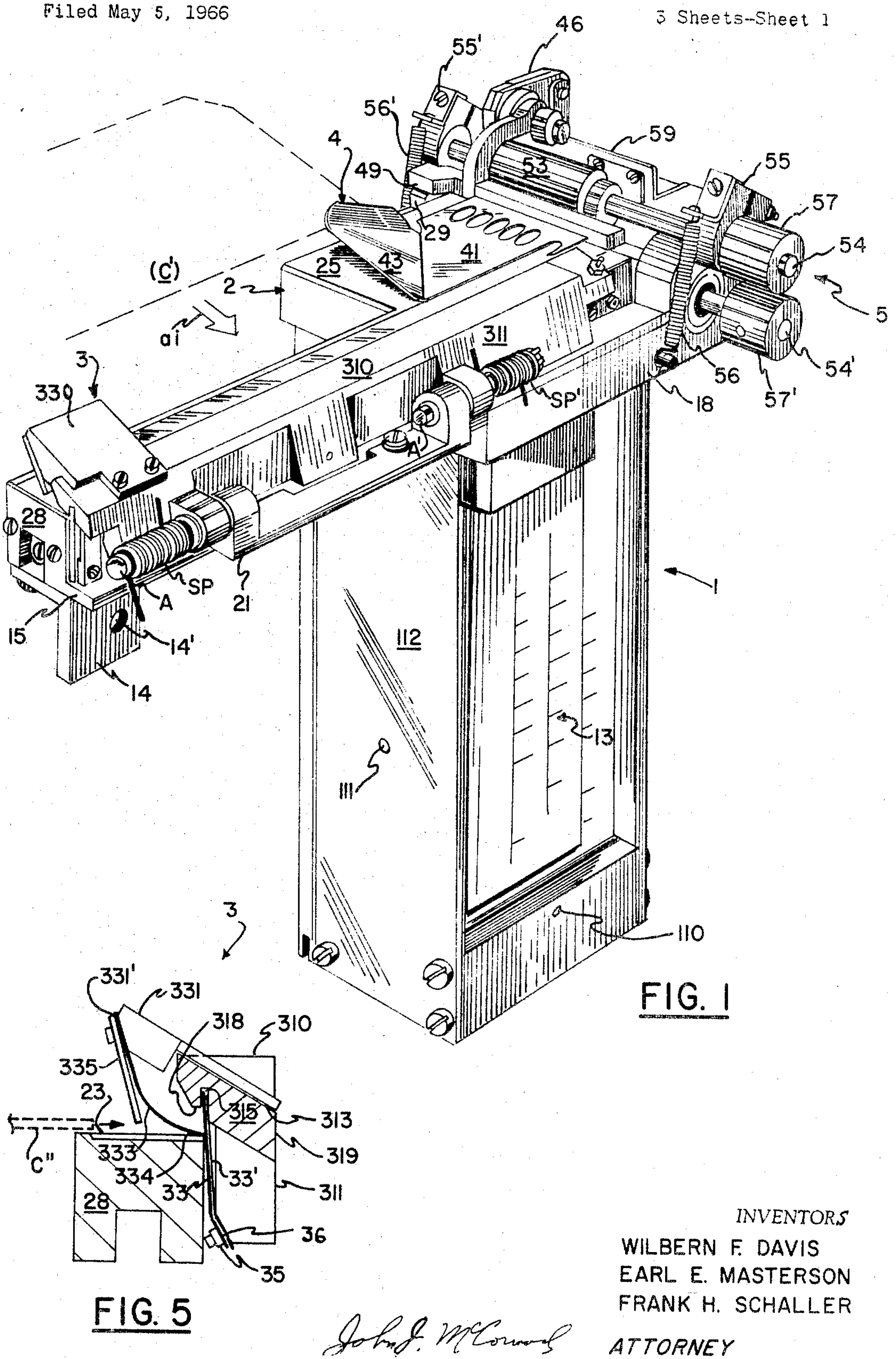
FIGURE 1 is a top perspective view of one side of a card-handling station according to the invention.
FIGURE 5 is a side section through the station in FIGURE 2, along lines V—V.
Figures 2, 4:
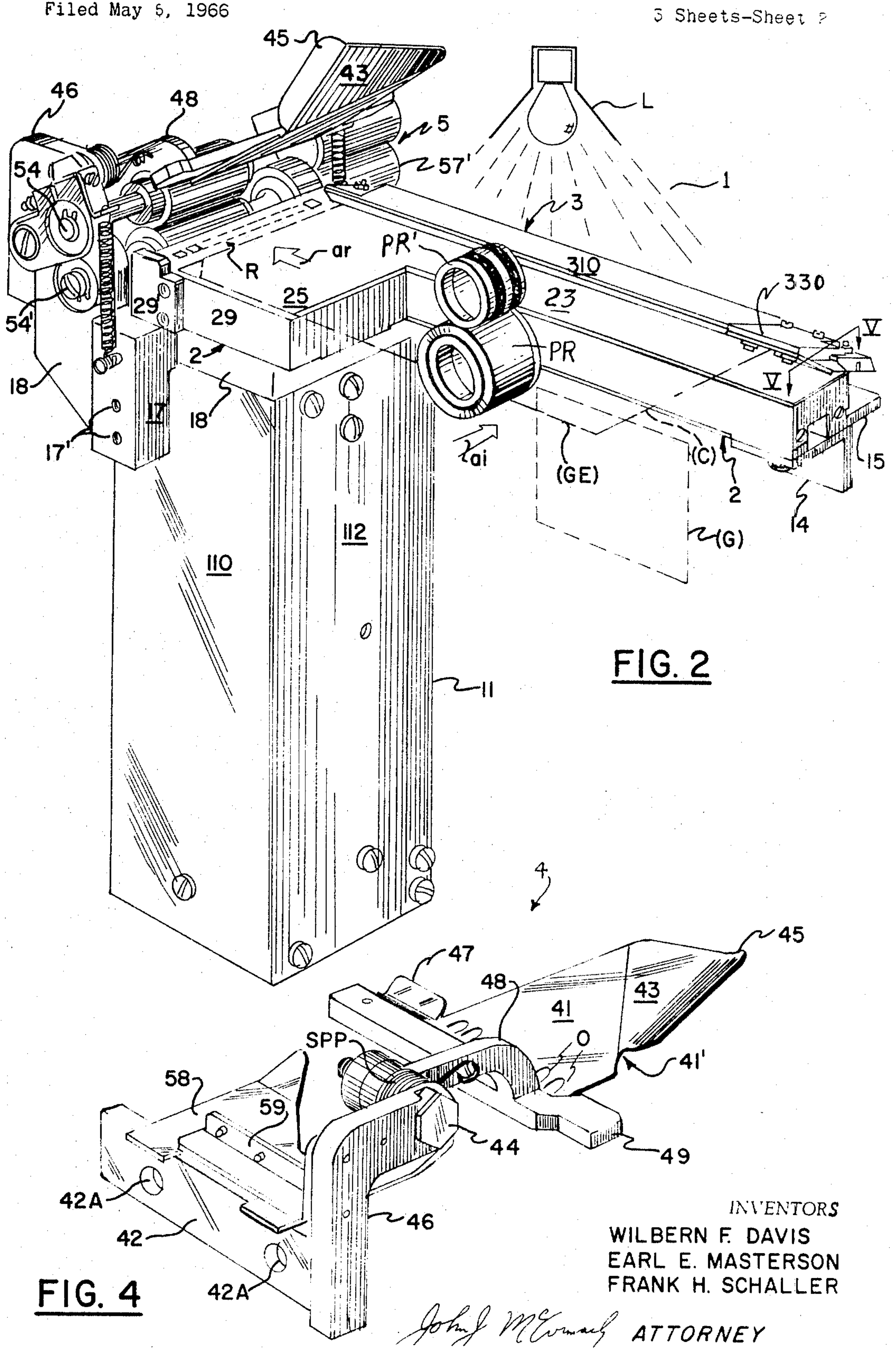
FIGURE 2 is a top perspective view of the other side of the station in FIGURE 1.
FIGURE 4 is an enlarged top perspective view of a card depressing clamp arrangement shown in FIGURES 1 and 2.

Referring first to FIGURES 1 and 2, there is here illustrated an embodiment of the invention comprising a plug-in type card-reading cornering station 1 adapted to receive incoming cards along an injection direction arrow *ai* and to divert them and guidingly advance them along an ejection direction arrow *ar*, past a read plate R. Station 1 generally comprises a lower frame 11 on which is mounted an upper frame 18, on which, in turn, are mounted a card reading assembly 2, a card lateral guide assembly or corner-rail 3, a card depressing clamp assembly 4 and a card-advancing transport assembly 5. Assemblies 3 and 4 align cards in fixed relation with plate R of reading assembly 2, as transport assembly 5 advances them in a prescribed manner across plate R, as indicated by arrow *ar* (FIG. 2). Cornering station 1 will be understood, therefore, as accepting injected cards (C′, FIGURE 1) thrust thereinto (by means not shown, such as by a conventional card picker) along direction *ai* to be referenced against corner rail 3, being thereafter thrust along a reference base portion 25 of assembly 2 in direction *ar* while being resiliently urged into prescribed alignment relative assembly 2 by assemblies 3, 4. A pair of conventional, selectively engageable pinch rolls PR, PR′, or any other well-known document-translating means, will be understood as adapted for initiating the translation of documents along direction *ar* and into engagement with transport assembly 5 (rolls 57, 57′) for continuation of this translation. Thus, after a document has been injected along direction *ai*, pinch rolls PR, PR′ will be selectively thrust toward one another, to engage the intermediate document (in the narrowed "bite" therebetween), while one or both is rotated (by means not shown, but very well-known in the art) to initiate this translation by frictional engagement with the document. Of course, thereafter, rolls PR, PR′ will be disengaged and separated to admit a following (injected) document therebetween. Preferably, an indexing guide edge, such as step G (shown in phantom, FIGURE 2) is provided to seat the card edge firmly and uniformly against rail 3 by confining the opposite card-edge (e.g. edge GE of card C, shown in phantom). When, thereafter, it is desired to read card C, a conventional lateral transport means (not shown), such as a pinch roll, may be activated to thrust card C in direction *ar*, across surfaces 23, 25 across read-detecting cells conventionally associated with read plate R and to be thereafter engaged for advancement by the rolls of advance assembly 5. Assemblies 3, 4 operate to maintain card C in prescribed alignment during this lateral translation. The particular details of this embodiment will now be described below followed by a summary indicating the operation thereof more particularly.

Lower frame 11 is metal and, besides supporting upper frame 18, also provides a protected noise shielding enclosure for electrical circuit components; indicated at 13, such as pluggable circuit boards adapted for controlling the operation of the strobing and reading means aforementioned. Those skilled in the art will recognize that such an arrangement advantageously locates control circuit elements conveniently adjacent associated detectors, facilitating "on-the-spot" trouble-shooting, e.g. through a removable side plate 112. This simplifies testing and repair and also reduces conductor lengths to a minimum. Upper frame means 18 is mounted on lower frame 11 being joined thereto by a bracket 17. Frame 18 is adapted to support card-advance assembly 5, hold-down clamp assembly 4, rail 3, and reading assembly 2 in fixed spaced relation. Frame 18 includes an extended portion 15 to which is attached a bracket 14 for detachably mounting station 1 to the main frame of a card-handling machine, such as with bolts in bore 14′. Frame 18 is adapted to be attached to the associated machine at two other points such as with bolts through tapped bores 17′ in bracket 17. This three-point mounting connection enables one to align station 1 in the overall machine so that it completes an uninterrupted transport path with related transport elements therein.

Reading assembly 2 evidently comprises a read/detector arrangement including read-plate R and a strobe plate 23 operatively associated with read-strobing means. Each plate co-acts wih associated photo-detector means thereunder, providing light apertures thereto, as understood in the art, Lamp L acting to energize them. According to one feature of the invention, frame 18 locates transport assembly 5 in fixed, pre-set relation with reading assembly 2 and associated alignment means 3 and 4. Thus, a pair of upper and lower roller axles 54, 54′, respectively are journaled in bracket portions of frame 18 and adapted to carry upper and lower drive rolls 53, 53′ respectively, and associated upper and lower belt engaging rolls 57, 57′, respectively these elements being coupled conventionally. Preferably, upper axle 54 is journaled between a pair of spaced upper blocks 55, 55′ which are resiliently pivoted from frame 18, being spring-depressed in a prescribed manner, such as by associated coil springs 56, 56′. This resiliently pivotable mounting depresses upper roller 53 against lower roller 53′, allowing the rollers to yield disengagingly, so as to accommodate lumps on cards, removal of a card after jamming, or the like.

According to another feature of the invention, cornering rail 3 provides a guide means for the edge of a card being stepped for reading, keeping it in fixed relation with the detectors of reading assembly 2, along a prescribed ejection path. Rail 3 is resiliently and pivotably mounted on frame extension 15, such as on a pair of spaced pivot axles, A, A′ journaled in projecting journal portions 211, 211′ of a pivot block 21 connected by a land portion 213. Block 21 is rigidly mounted on extension 15 so that rail 3 will be resiliently urged downwardly against surface of strobe plate 23, such as by torsion springs SP, SP′. Rail 3 generally comprises an elongate flexure assembly 31 journaled on axles A, A′ (see FIGURE 3) and having a "short card" stop 33 mounted thereon. Flexure assembly 31 comprises a rigid mount 310 having leading and trailing beveled terminal surfaces 314, 313, respectively and a longitudinal groove 315 adapted to receive the top edge 34 of flexure blade 33 stoppingly. Surface 314 lies adjacent trailing end 319 of mount 310 and is adapted to receive short-card stop assembly 330. Assembly 31 also includes blade 33 and clamp 35 for attaching blade 33 to bevel 317 of mount 310.

Figure 3:
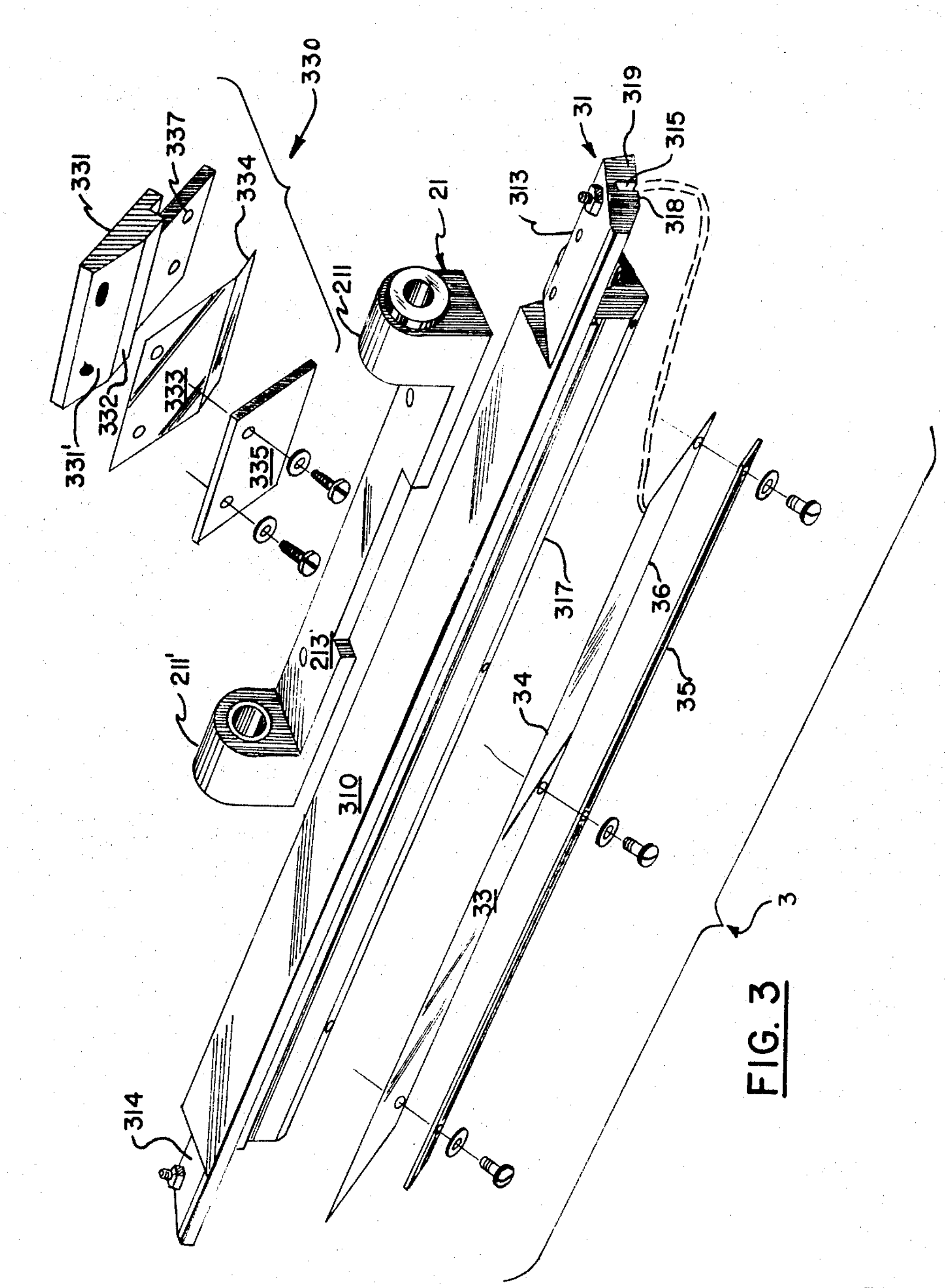
FIGURE 3 is an exploded detailed view of the guide rail means illustrated in FIGURES 1 and 2, certain portions thereof being exploded apart, somewhat pivotingly, for clarity.

As best seen in FIGURES 3, 5, flexure plate 33 which may preferably comprise a thin leaf of spring steel or the like, extends most of the length of strobe plate 23 being adapted to have one elongate edge thereof thrust resiliently against the top corner of plate 23. Thus, the lower elongate edge 36 of flexure plate 33 is attached to surface 317 beveled at such an angle as to lock upper edge 34 thereof yieldingly in groove 315 with a prescribed card-returning force when deflected there by injected cards. Groove 315 is provided along the length of rail 31 to retain edge 34, the width of blade 33 thus being dimensioned so that with the blade thus attached along both the elongate edges a prescribed lateral bow may be placed therein biasing it against the edge of plate 23 oppositely to the injection direction *ai*.

Those skilled in the art know that it is important to maintain a prescribed spacing between card advancing rollers 53, 53′ since variations therein may twist or tip cards, deflecting them from their intended destination, scuffing and injuring them, or causing jams. It is also important to fix the position of transport assembly 5 relative reading assembly 2 and alignment means 3, 4 since variations therein will obviously cause strobing and reading errors. Fixing these elements to common mounting plate 18 is a feature effecting such constant spacings, unlike conventional independent mounting arrangements therefor.

It will be apparent to those skilled in the art that cards, such as C, may be presented to cornering station 1 from injection means, such as a card picker, along the injection path (*ai*) to come into engagement with cornering rail 3, being lodged there by reference edge G opposite rail 3 and resting upon the flat coplanar surfaces of strobe plate 23 and reference surface 25. It will be understood that plate 23 is wide enough to extend along an appreciable portion of the normal card height being abutted against surface 25 adjacent read plate R, but comprising the only support for the card relatively towards its trailing edge i.e. toward end 28 of assembly 2 (FIG 1). Thus, surface 25 is terminated to provide a cavity adjacent the trailing edge portion of plate 23. This cavity will be understood as apt for provision of card transport means, such as the selectively engageable pinch rolls conventionally used to advance cards into the bite of transport assembly 5. Until cards are so engaged by transport means, however, there is a possibility that forces may urge the records opposite to the direction of ejection i.e. opposite arrow *ar*. For instance, it is often convenient to mount station 1 so that surfaces 23, 25 are tilted so that gravity will urge cards back toward their trailing edge and away from direction *ar*. Thus, it will be evident that stop means must be provided to limit this travel, at least to that beyond which it will be impossible to engage the card with the pinch roll or which will improperly uncover detection means (such as cells along strobe plate 23) and the like. Such a stop surface will be understood as to be normally provided operatively adjacent, but slightly beyond trailing end 28 of assembly 2, that is, the end thereof opposite read station R. Such a surface is not here shown, since it may be readily understood by those skilled in the art as being provided by adjacent machine surfaces, such as a frame sidewall, when selecting the mounting position of station 1 in the overall machine.

However, according to another feature of the invention, station 1 is made adaptable for handling cards of a second shorter length and thus preferably includes a "short-card" stop limit means 330 as aforementioned. Stop limit 330 will be seen below to advantageously provide a simple arrangement for referencing the extreme travel of short-cards opposite ejection direction *ar* while still resiliently admitting longer cards thereunder during injection across plate 23 to engage cornering flexure 33.

More particularly, "short-card" stop assembly 330 is attached to rail mount 310 on surface 313 thereof such as by conventional screw means. Thus, stop 330 may comprise a plate 331 having a beveled surface 331′ whereon a flexure plate 333 is affixed such as by clamp 335, as indicated. Plate 331 may be attached to surface 313 on mount 310 such as through screw bores 337 in an extended portion thereof. Plate 333 is mounted to project a free tip thereof 334 in prescribed relation with the surface of strobe plate 23, tip 334 preferably being curved as indicated.

The operative relation of these parts is best seen in the sectional view of FIGURE 5 comprising a vertical section through rail 3, including stop 330, and illustrating cooperative flexure blades 33, 333 and the positions thereof, relative to one another, relative to the top of plate 23 and to an incoming card, indicated in phantom at C″. With rail 3 in the normal, operative depressed condition shown in FIGURE 1, it will be seen that stop assembly 330 will position short cards while elongate damping flexure 33 arrests all cards smoothly, guiding them along ejection direction *ar*. Thus, flexure plate 33 is arranged to flexibly stop and align the long edge of an incoming car C″. An overhang portion rail mount 310 is arranged to present a lower edge 318 thereof a prescribed clearance above plate 23 so that plate 33 may seat in groove 315 therein. Card C″ will be seated against plate 33 by registering step edge G (FIGURE 2). For a prescribed shorter length card such as card C indicated in FIGURE 2, the trailing edge thereof may be stop-limited, or position-referenced against the edge of stop flexure blade 333, while clamp 335 acts to protect flexure 333 from impacting. The outer edge or tip 334 of blade 333 extends to closely adjacent damping flexure 33 and into bent, flexed engagement with the top of plate 23.

As indicated before, a resiliently depressible clamp 4 is provided to maintain cards against reference surface 25 being upwardly pivotable therefrom as indicated in FIGURE 2 and being arranged in prescribed non-shadowing relation with the detection apertures of read plate R and strobe plate 23. As indicated more particularly in the enlarged perspective of FIGURE 4, clamp 4 includes a flat plate portion 41 arranged to be resiliently depressed toward surface 25 to come relatively coplanar therewith a prescribed clearance thereabove. Plate 41 has an upwardly bent outer corner portion 43 tipped up sufficient to avoid snagging the edges and corners of incoming cards, and also has a lateral guide portion including upwardly tipped edge 47 extending toward guide rail 3 to prevent the card edge adjacent thereto from skying. Extended edge 47 avoids shadowing the apertures of strobe plate 23 and is curled upward somewhat to avoid edge-snagging. Corner 43 may be canted upwardly to define a cam-plane, for instance, tilted at about 30° with surface 25. Corner 43 may also include a backwardly curled tip 45, curled upward further to avoid snagging upwardly directed incoming card edges and to provide a camming action urging such edges toward reference surface 25. Plate 41 may be cut out slightly as at 41′ to facilitate this bending of corner 43. Plate 41 is attached to a mounting bracket 49 and is relieved at aperatures O along the join therebetween, apertures O being provided to admit light to the reading slits in plate R and avoid shadowing thereof. Bracket 49 is pivotably mounted from a bracket 46 which, in turn, is attached to upper frame 18 along an extended portion 42 thereof through bores 42A therein. For this purpose a pivot axle 44 may be provided together with a torsion spring SPP and an arcuate arm 48 connecting bracket 49 to be resiliently journaled about axle 44. Arm 48 is urged downwardly toward surface 25 by torsion spring SPP, as known in the art. A clearance ledge, or stop, 29′ (FIG. 2) limits this urging to establish the aforesaid spacing between plate 45 and surface 25. Bracket 46 is rigidly attached to frame 18 as aforementioned and may also serve to mount a cam-deflecting means 58 via projecting bracket 59 attached thereto. Cam guide 58 prevents cards being advanced by rollers 53 from flying upwardly and directs them onward in the direction of arrow *ar* to a utilization station, such as a card punch, a stacking means, or the like.

It will thus be seen that when a card, such as card C′ in FIGURE 1, is injected into read/wait station 1, being thrust along reference surface 25 and coplanar surface 23, the leading edge thereof may be cammed downwardly along the surface by tip 43 of clamp 41. When further thrust, card C′ will drop past reference edge G and be locked into resilient engagement with damping flexure blade 33, being aligned along the reference surface provided by guide rail 31. In the case of a shorter card, the longitudinal travel opposite *ar* will be limited by stop flexure 333 engaging the trailing edge therefor. The card is then ready to be thrust along the ejection (reading/strobing) direction *ar* (by means not shown) being therewhile aligned by guide rail 3 and maintained against reference surfaces 23, 25, thereby, also being held down against plate 25 by resilient clamp assembly 4. Card C′ may thus be strobed by transport along plate 23 and simultaneously read-out at read plate R, being thereafter engaged for advancement by rollers 53, 53′. Further particulars of such an aligned reading/manipulation will be understood by those skilled in the art.

It will be readily apparent to those skilled in the art that the principles of the present invention are applicable to other related types of card handling apparatus including aligning and guiding means and card advancing means providing a unitary plug-in station for mounting these elements advantageously in prescribed fixed relation.

While in accordance with the provisions of the statutes, there has been illustrated and described the best form of the invention known, it will be apparent to those skilled in the art that changes may be made in the forms of the apparatus disclosed without departing from the spirit of the invention as set forth in the appended claims and that, in some cases, certain features of the invention may be used to advantage without a corresponding use of other features.

Having now described the invention what is claimed as new and for which it is desired to secure Letters Patent is:

1. In a record handling unit of a business machine adapted to accept records at an input station and to manipulate them, advancing them along a prescribed record path in a prescribed exit direction to an exit station, an improved detachable card handling unit in combination therewith, said unit being adapted to be affixed to said machine so as to locate record manipulating elements operatively along a portion of said path with said elements mounted in a unitary, removable package fixing the relative positions thereof and providing ready access thereto, said unit comprising in combination:

detachable frame means adapted to be removably attached to said machine; reference surface means mounted on said frame means so as to comprise a portion of said path; record transport means mounted on said frame means in prescribed spaced relation with said surface means for advancing records therealong; and record alignment means mounted on said frame means in prescribed relation with said surface means and said transport means so as to guide said records across said surface means along said path.

2. The combination as recited in claim 1 wherein said alignment means comprises lateral guide means including elongate resilient flexure plate means, said guide means being so mounted on said frame means as to present said flexure plate means for resilient aligning engagement with prescribed side edges of said records.

3. The combination as recited in claim 2 wherein said guide means comprises a guide block pivotably mounted from said frame means and carrying said flexure plate means disposed thereon to be relatively normally engaged by incoming records along said surface means for arresting thereof, so as to divert them relatively orthogonally and guide them along said path.

4. The combination as recited in claim 3 wherein said lateral guide means includes stop-limit means disposed to prevent movement of said records opposite to said exit direction beyond a prescribed trailing-edge reference position; wherein said surface means comprises a read station and associated strobe means extending coplanar along said path and aligned with said guide means so as to maintain said records in prescribed constant operable relation with said surface means as they are advanced thereacross and wherein said transport means includes a pair of feed rolls mounted on said frame means in prescribed relation with one another and with said read station.

5. The combination as recited in claim 4 wherein said unit is adapted to handle records of a prescribed long length and a prescribed short length; wherein said frame means is adapted to house manipulation circuit control means associated with said unit; wherein said stop-limit means comprise a primary stop surface disposed to provide a long card stop at a prescribed long reference position and also a secondary stop means disposed to provide a short card stop at a prescribed short reference position, said secondary stop means including flexure plate means mounted from said block to project a free end thereof into flexible engagement with said surface means along said reference edge thereof so as to admit the introduction of said long records, a side of said flexure plate being disposed to provide said shorter card stop as well; and wherein said alignment means additionally includes hold-down means comprising a flat plate mounted from said frame means to be resiliently urged coplanarly adjacent said reference surface means, being disposed relative said guide means and said transport means so as to maintain portions of said records proceeding along said path flush against said surface means therewhile and in referenced alignment with said read station and said strobe means.

6. An improved integrated cornering station for use in a record handling machine wherein records proceeding along a first injection path are arrested to be diverted along a second relatively orthogonal ejection path, said station comprising in combination:

a rigid frame adapted to be affixed to said machine in prescribed relation therewith; platform means along which said records are to be so diverted, said platform means being disposed so as to present a transport surface forming the cornering portion of said paths at the juncture thereof; and elongate resilient cornering means mounted to extend along an edge of said surface, said cornering means including a resilient flexure plate adapted to so resiliently engage associated edges of said records as to resiliently arrest and corner them smoothly, quietly and without damage thereto.

7. The combination as recited in claim 6 wherein said cornering means comprises a guide block having an overhang portion thereof including a groove and disposed to be suspended a prescribed clearance above said edge of said surface; wherein said flexure plate is attached to said block below said surface so as to project a free end thereof up adjacent said edge and beyond to be stoppingly, but movably, engaged in said groove and thus present a depressible flexible surface for said arrestment of said records.

8. The combination as recited in claim 7 wherein said station is adapted to handle prescribed-length long records and also relatively short records; wherein said frame is arranged to be detachably mounted in said machine; wherein said block is pivotably mounted from said frame so as to allow pivoting of said flexure plate away from said edge of said surface means for access thereto; and wherein said block also includes resilient short-card stop means adapted to limit the travel of the trailing edges of said short records opposite said ejection path beyond a prescribed short-limit position also being sufficiently resilient to admit said long records.

9. The combination as recited in claim 8 wherein said cornering station is arranged to be mounted adjacent a machine surface that the latter provides a long-card stop axis limiting the travel of said long cards opposite said ejection path; wherein said short card stop means comprises a flexure leaf suspended from said guide block so as to present a free end thereof in resilient engagement against said surface means adjacent said edge thereof, being also disposed so that an edge thereof establishes said short-card stop limit.

10. The combination as recited in claim 9 wherein is included depressing guide means adapted to engage said records to prevent skying thereof and comprising:

a resilient pivot arm means mounted from said frame so as to be urged against said surface; flat plate means mounted from said pivot arm means to be resiliently urged thereby against said surface of said platform means;

said plate means itself including: record-camming corner portions bent to gradually align said records against said surface and clearance means for limiting the travel of said plate means to be disposed a prescribed clearance above said surface.

11. The combination as recited in claim 6 wherein is included depressing guide means adapted to engage said records to prevent skying thereof and comprising support means mounted from said frame; flat depressing means mounted from said support means so as to be urged thereby against said surface of said platform means, said depressing means being adapted to gradually align said records against said surface.

References Cited

UNITED STATES PATENTS

| | | | |
|---|---|---|---|
| 3,207,505 | 9/1965 | Nielsen | 271—3 |
| 3,315,955 | 4/1967 | Schaller | 271—3 |
| 2,665,633 | 1/1954 | Schubert. | |
| 3,062,532 | 11/1962 | Galatha | 271—5 |

RICHARD E. AEGERTER, *Primary Examiner.*